United States Patent [19]

Morioka

[11] Patent Number: 5,387,932
[45] Date of Patent: Feb. 7, 1995

[54] VIDEO CAMERA CAPABLE OF ADDING, TRANSMITTING, AND EXTRACTING A REFERENCE SIGNAL INDICATIVE OF THE POSITION OF A REFERENCE PIXEL

[75] Inventor: Yoshihiro Morioka, Kanagawa, Japan

[73] Assignee: Sony Corporation, Tokyo, Japan

[21] Appl. No.: 907,142

[22] Filed: Jul. 1, 1992

[30] Foreign Application Priority Data

Jul. 6, 1991 [JP] Japan .................................. 3-192643

[51] Int. Cl.$^6$ .......................................... H04N 5/335
[52] U.S. Cl. ..................................... 348/246; 348/65
[58] Field of Search ..................... 358/213.17, 213.15; H04N 5/335; 348/207, 246, 247, 311, 312, 65, 76

[56] References Cited

U.S. PATENT DOCUMENTS

| 4,237,488 | 12/1980 | Takemura ........................... 358/163 |
| 4,542,404 | 9/1985 | Duschl ................................ 358/106 |
| 4,590,520 | 5/1986 | Frame et al. ....................... 358/163 |
| 4,698,685 | 10/1987 | Beaverson ...................... 358/213.15 |
| 4,701,784 | 10/1987 | Matsuoka ....................... 358/213.17 |
| 4,831,444 | 5/1989 | Kato . |
| 4,858,013 | 8/1989 | Matsuda ........................ 358/213.17 |
| 4,893,185 | 1/1990 | Fukushima et al. ........... 358/213.17 |
| 4,910,598 | 3/1990 | Itakura et al. ................. 358/213.17 |
| 5,144,446 | 9/1992 | Sudo .............................. 358/213.11 |

FOREIGN PATENT DOCUMENTS 2071676  6/1988  Japan ........................... H04N 5/222

OTHER PUBLICATIONS

Patent Abstracts of Japan vol. 14, No. 188 (C-0710) 17 Apr. 1990 & JP-A-2 034 140 (Olympus Optical Co. Ltd.) 5 Feb. 1990.
Patent Abstracts of Japan vol. 11, No. 17 (E-471) (2464) 17 Jan. 8761 & JP-A-61 187 470 (NEC Corp.) 21 Aug. 1986.
Patent Abstracts of Japan, vol. 7, No. 280 (E-216) 14 Dec. 1983 & JP-A-58-157 261 (Mitsubishi Denki K.K.) 19 Sep. 1983.
Patent Abstracts of Japan vol. 13, No. 522 (E-849) (3870) 21 Nov. 1989 & JP-A-1 213 075 (NEC Corp.) 25 Aug. 1989.
Patent Abstracts of Japan vol. 13, No. 301 (E-785) (3649) 11 Jul. 18989 & JP-A-1 078 079 (Furukawa Electric Co. Ltd. 23 Mar. 1989.
Patent Abstracts of Japan vol. 14, No. 252 (E-0934) 30 May 1990 & JP-A-2 071 676 (NEC Corp.) 12 Mar. 1990.

Primary Examiner—Michael T. Razavi
Assistant Examiner—Ngoc-Yen Vu
Attorney, Agent, or Firm—William S. Frommer; Alvin Sinderbrand

[57] ABSTRACT

In a video camera having an image pick-up section and a signal processing section to which an output signal from the image pick-up section is supplied through a transmission cable, there are provided in the image pick-up section, an image pick-up device and reference signal adding means for adding a reference signal indicative of the position of a reference pixel of the image pick-up device in a predetermined interval of an output video signal of the image pick-up device and there is provided in the signal processing section extracting means for extracting the reference signal from a signal which is supplied from the image pick-up section.

1 Claim, 3 Drawing Sheets

VIDEO CAMERA CAPABLE OF ADDING, TRANSMITTING, AND EXTRACTING A REFERENCE SIGNAL INDICATIVE OF THE POSITION OF A REFERENCE PIXEL

BACKGROUND OF THE INVENTION

1. Field of the Invention

This invention relates to a video camera and, more particularly, to a HDTV-type video camera.

2. Description of the Prior Art

When the number of pixels of a CCD image pick-up device increases, the resolution in reproduction is improved. However, as the number of pixels increases, the problem with defects of pixels grows. An existing system corrects defects of pixels in a CDS circuit on the part of a camera, or in a defect correcting circuit as disclosed in the U.S. Pat. No. 4910598.

In FIG. 1, a reference sync signal REFSYNC is sent from a terminal 10 to a camera control unit (hereinafter called CCU) 11. The reference sync signal REFSYNC is sent from the CCU 11 to a signal generator 14 in the camera 12 through a transmission cable 13 which connects the camera 12 to the CCU 11.

The signal generator 14 generates a timing signal for each circuit element on the basis of the reference sync signal REFSYNC sent from the CCU 11. The timing signal is sent to a CCD driver 15. A transfer clock is made in the CCD driver 15, and it is sent to the CCD image pick-up device 16. In response to the transfer clock, the CCD image pick-up device 16 is driven, and outputs an image pick-up signal. The output signal from the CCD image pick-up device 16 is sent to a CDS circuit 17, which samples it and holds the sampled value. An output signal from the CDS circuit 17 is sent to a process circuit 18 which includes a γ correcting circuit, a knee circuit and so forth. An output signal from the process circuit 18 is supplied to the CCU 11 via the cable 13.

Defects may occur in pixels of the CCD image pick-up device 16. In defective pixels, the preceding sampled value is output from the CDS circuit 17. Then the defects of the CCD image pick-up device 16 is corrected.

On the other hand, a high definition TV system using 1125 scanning lines (hereinafter called HDTV) is nearly brought to practical use. The number of pixels of a CCD image pick-up device of a HDTV video camera is much more than that of an NTSC television system. Therefore, the number of defective pixels also increases. As a result, if correction of the defects of the CCD image pick-up device 16 relies on the CDS circuit 17 on the part of the camera as shown in FIG. 1, a heavy load is imposed on the CDS circuit 17. A solution to avoid this problem is to provide a defect correcting circuit on the part of the CCU 11. More complicated signal processing is possible on the part of the CCU 11 than on the part of the camera.

As discussed above, in order to correct defects on the part of the CCU 11, it is necessary that a signal for obtaining address information of the CCD image pick-up device 16, that is, a signal for obtaining information having the same time base as the transfer clock given to the CCD image pick-up device 16 in the camera 12, be sent from the camera 12 to the CCU 11. It may be possible to use the sync signal contained in the video signal as the information.

However, since the frequency of the transfer clock is much higher than that of the sync signal, if defects of pixels is corrected by the CCU 11, the accuracy of the time base is insufficient, only with the sync signal added to the video signal. In addition, stabilities of the CCD driver 15 and the process circuit 18, GEN-lock accuracy in case of a change in length of the cable 13, and stability of the signal generating circuit, etc. in the CCU 11 must be taken into consideration. Therefore, the accuracy of the time base is insufficient, only with the reference sync signal REFSYNC.

OBJECTS AND SUMMARY OF THE INVENTION

It is therefore an object of the invention to provide a video camera that can transmit a reference signal indicative of the position of a reference pixel in a CCD image pick-up device from a camera to a CCU.

Another object of the invention is to provide a video camera that can perform a defect correcting process for a video signal transmitted from a camera to a CCU on the part of the CCU.

In order to accomplish the main object of the invention, according to the invention, in a video camera having an image pick-up section and a signal processing section to which an output signal from the image pick-up section is supplied through a transmission cable, there are provided in the image pick-up section an image pick-up device and reference signal adding means for adding a reference signal indicative of the position of a reference pixel of the image pick-up device in a predetermined interval of an output video signal of the image pick-up device, and there is provided in the signal processing section, extracting means for extracting the reference signal from a signal which is supplied from the image pick-up section.

In order to accomplish another object of the invention, according to the invention, in a video camera having an image pick-up section and a signal processing section to which an output signal from the image pick-up section is supplied through a transmission cable, there are provided in the image pick-up section an image pick-up device and reference signal adding means for adding a reference signal indicative of the position of a reference pixel of the image pick-up device in a predetermined interval of an output video signal of the image pick-up device, and there are provided in the signal processing section, extracting means for extracting the reference signal from a signal which is supplied from the image pick-up section defect correcting means for performing a defect correcting process for a video signal which is supplied from the image pick-up device on the basis of the reference signal which is extracted by the extracting means.

The above, and other, objects, features and advantage of the present invention will become readily apparent from the following detailed description thereof which is to be read in connection with the accompanying drawings.

DETAILED DESCRIPTION OF THE PREFERRED EMBODIMENTS

Figure 1:
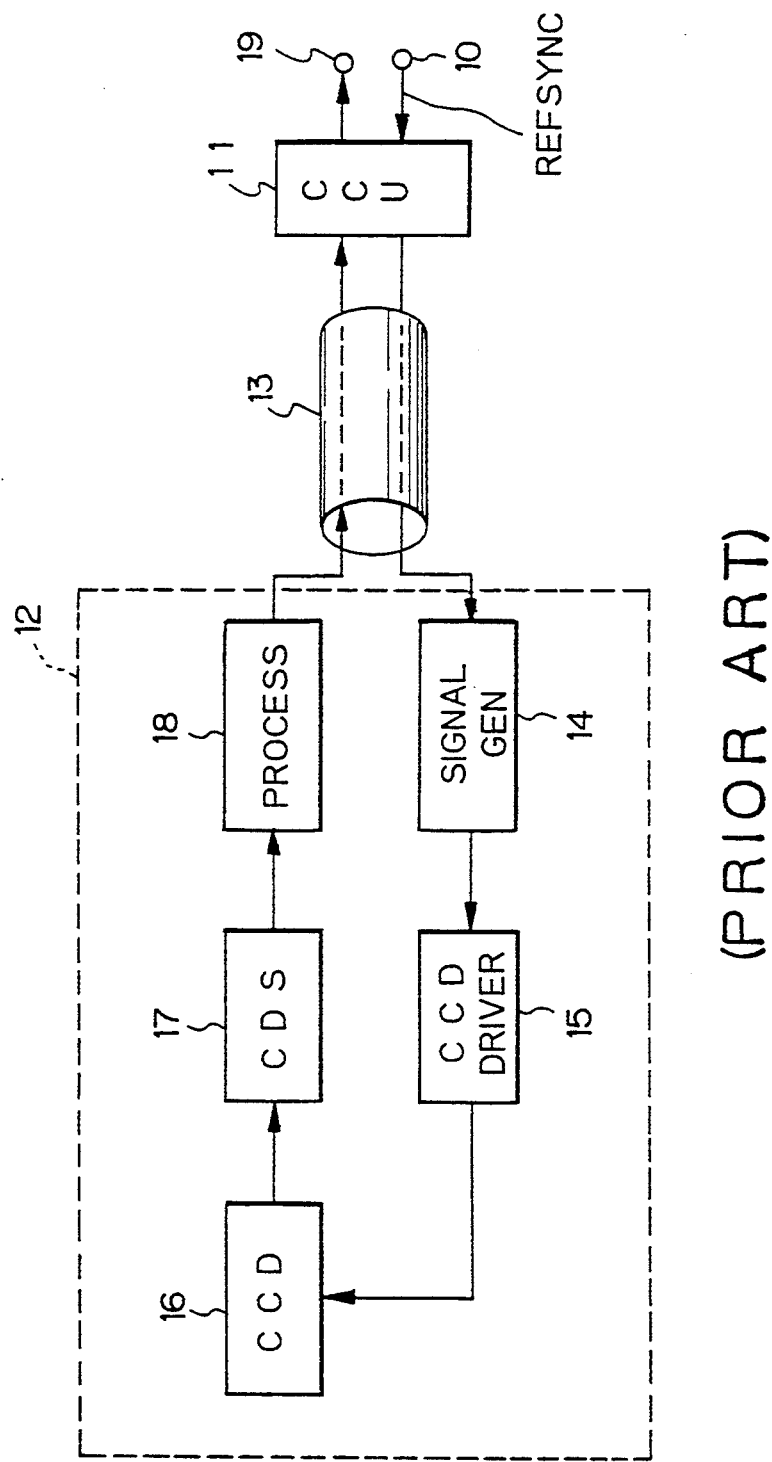
FIG. 1 is a block diagram of an existing video camera.
Figure 2:
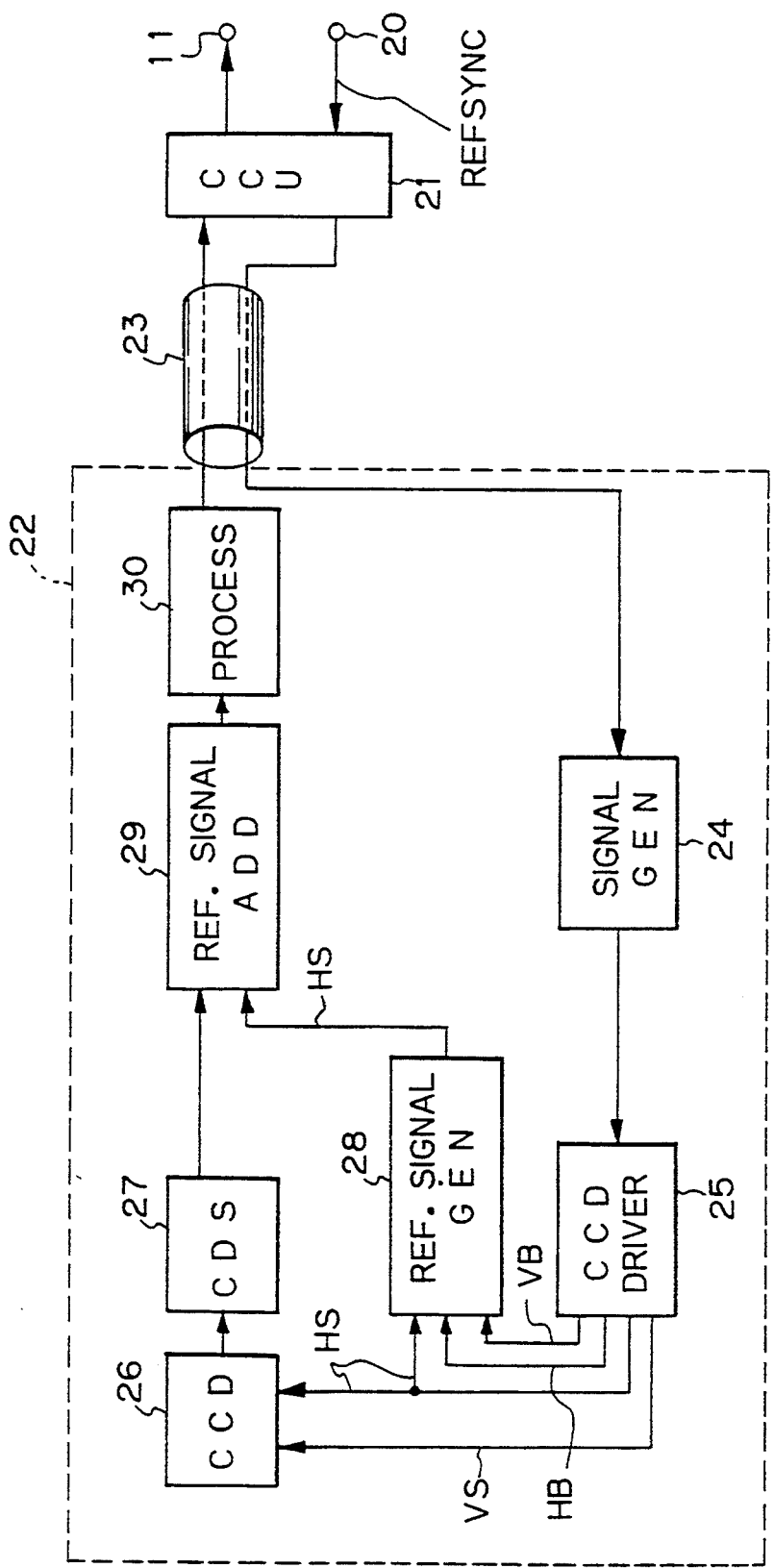
FIG. 2 is a block diagram showing an embodiment of the invention.

An embodiment of the invention is explained below with reference to the drawings. FIG. 2 is a block diagram showing the embodiment of the invention. In FIG. 2, a reference sync signal REFSYNC is supplied from a terminal 20 to a CCU 21. The reference sync signal REFSYNC is transmitted to a signal generator 24 on the part of a camera via a cable 23 which connects the camera 22 to the CCU 21. The signal generator 24 generates a timing signal for each circuit element on the basis of the reference sync signal REFSYNC sent from the CCU 21. The timing signal is fed to a CCD driver 25. The CCD driver 25 supplies a CCD image pick-up device 26 with a horizontal transfer clock HS and a vertical transfer clock VS. In response to these signals, the CCD image pick-up device 26 is driven. An output signal from the CCD image pick-up device 26 is fed to a CDS circuit 27, and it is sampled and held there. The video signal output from the CDS circuit 27 is sent to a reference signal adding circuit 29.

On the other hand, the horizontal transfer clock HS, a horizontal blanking pulse HB and a vertical blanking pulse VB are supplied from the CCD driver 25 to a reference signal generating circuit 28. In one horizontal interval of the vertical blanking period, the transfer clock HS used as a reference signal is output from the reference signal generating circuit 28. The output signal from the reference signal generating circuit 28 is supplied to the reference signal adding circuit 29.

In the reference signal adding circuit 29, the transfer clock HS from the reference signal generating circuit 28 is added to the video signal output from the CDS circuit 27. The transfer clock HS is added, for example, in 1H interval of the vertical blanking period of the video signal. An output signal from the reference signal adding circuit 29 undergoes various controls by a process circuit 30 and then sent to the CCU 21 via the cable 23.

The horizontal transfer clock HS and the vertical transfer clock VS given to the CCD image pick-up device 26 are in the relation of 1:1 with the address of a pixel of the CCD image pick-up device 26. Therefore, by sending to the CCU 21 the transfer clock HS output from the reference signal generating circuit 28 and added to the video signal, information on the address of the pixel of the CCD image pick-up device 26 is obtained on the part of the CCU 21.

Figure 3:
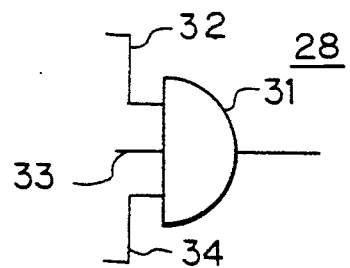
FIG. 3 is a circuit diagram showing an example of a reference signal generating circuit in the video camera shown in FIG. 2.
Figure 4A:
FIGS. 4A to 4D are waveform diagrams for use in explanation of the operation of the reference signal generating circuit shown in FIG. 3.
Figure 4B:
Figure 4C:
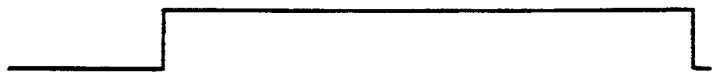
Figure 4D:

The reference signal generating circuit 28 may be in the form of an AND gate 31 having three input terminals as shown in FIG. 3. The AND gate 31 is supplied with the horizontal transfer clock HS (see FIG. 4A) through a first input terminal 32, the horizontal blanking pulse HB (see FIG. 4B) through a second input terminal 33, and the vertical blanking pulse VB (see FIG. 4C) through a third input terminal 34. From the AND gate 31, as shown in FIG. 4D, the transfer clock HS used as a reference signal is taken out in 1H intervals of the vertical blanking period.

Figure 5:
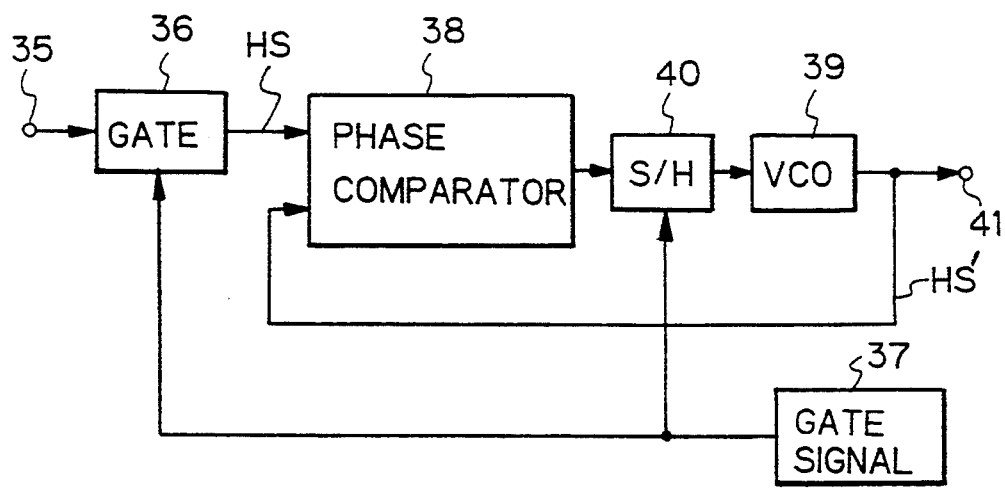
FIG. 5 is a block diagram showing an example of a reference signal extracting circuit in a CCU of the video camera shown in FIG. 2.

FIG. 5 shows an example of the circuit in the CCU 21 for generating a highly accurate reference signal from the transfer clock HS sent to the CCU 21 from the camera 22 in 1H intervals of the vertical blanking period. In FIG. 5, the video signal from the camera 22 is supplied through the input terminal 35 to the gate circuit 36. The video signal is accompanied by the transfer clock HS in 1H intervals of the vertical blanking period. A gate signal is output from a gate signal generating circuit 37 at the incoming timing of the transfer clock, and it is supplied to a gate circuit 36. The gate circuit 36 passes only the transfer clock HS to a phase comparator 38. The phase comparator 38 is supplied with an output signal from a VCO (voltage controlled oscillator) 39. An output signal from the phase comparator 38 is fed to the VCO 39 via a sample-hold circuit 40. An output signal from the VCO 39 is supplied to a terminal 41.

Note here that the output signal HS' from the VCO 39 is fed back to the phase comparator 38. As long as the transfer clock HS is sent, the phase comparator 38 compares the phase of the transfer clock HS output from the gate circuit 36 with the phase of the output signal HS' from the VCO 39. A difference of the phase-compared signals (HS and HS') is supplied to the VCO 39 through the sample-hold circuit 40. The oscillating frequency of the VCO 39 is controlled on the basis of a difference signal from the sample-hold circuit 40. When the transfer clock HS is not sent, the VCO 39 is controlled by the difference signal held in the sample-hold circuit 40. Therefore, the same continuous clock as the horizontal transfer clock HS given to the CCD image pick-up device 26 is obtained from the terminal 41.

By A/D-converting the video signal sent from the camera 22 to the CCU 21 by using the transfer clock, thus obtained, each pixel can be properly sampled and A/D-converted. In addition, by processing the first pulse of the output signal as a horizontal address such as, for example, a first address or a specific address of the CCD image pick-up device 26, each pixel address can be properly reproduced in the CCU 21. And on the basis of the address, a defect correcting process is performed for the image pick-up signal in the defect correcting circuit provided in the CCU 21.

The embodiment described above adds the output signal from the reference signal generating circuit 28 in 1H intervals of the vertical blanking period. However, the invention is not limited to this. In addition, also when the video camera according to the invention is used as an instrument for measuring the position of an object, the optical position of a CCD imaging surface can be measured properly.

According to the invention, a signal corresponding to a pixel address of a CCD image pick-up device is added to a video signal and transferred from the camera to the CCU. By using the signal, information on the pixel address of the CCD image pick-up device can be obtained on the part of the CCU. Since the information is sent through the same transfer path as that of the video signal, the time base coincides with that of the video signal with a high accuracy. By using information, thus obtained, defects of the CCD image pick-up device can be corrected, for example, on the part of the CCU.

What is claimed is:

1. A video camera having an image pick-up section and a signal processing section to which an output signal from said image pick-up section is supplied through a transmission cable, comprising:
   a CCD image pick-up device, located in said image pick-up section, for producing a video signal;
   reference signal generating means, located in said image pick-up section, for generating a reference signal including a vertical blanking interval and a horizontal transfer clock signal within said vertical blanking interval;

reference signal adding means, located in said image pick-up section, for adding to said video signal said reference signal thereby producing said output signal;

extracting means, located in said signal processing section, for extracting from said output signal the horizontal transfer clock signal included in said reference signal; and defect correcting means, located in said signal processing section, for defect correcting said video signal based on said extracted horizontal transfer clock signal.

* * * * *